United States Patent
Suzuki et al.

(10) Patent No.: US 7,846,238 B2
(45) Date of Patent: Dec. 7, 2010

(54) METHOD OF MANUFACTURING POROUS POLYTETRAFLUOROETHYLENE MEMBRANE, FILTER MEDIUM, AND FILTER UNIT

(75) Inventors: Masatoshi Suzuki, Osaka (JP); Youji Uchida, Osaka (JP)

(73) Assignee: Nitto Denko Corporation, Osaka (JP)

( * ) Notice: Subject to any disclaimer, the term of this patent is extended or adjusted under 35 U.S.C. 154(b) by 306 days.

(21) Appl. No.: 12/225,023

(22) PCT Filed: Mar. 23, 2007

(86) PCT No.: PCT/JP2007/056093

§ 371 (c)(1),
(2), (4) Date: Sep. 11, 2008

(87) PCT Pub. No.: WO2007/119508

PCT Pub. Date: Oct. 25, 2007

(65) Prior Publication Data

US 2009/0071339 A1    Mar. 19, 2009

(30) Foreign Application Priority Data

Mar. 28, 2006    (JP) .............................. 2006-088175

(51) Int. Cl.
*B01D 53/22* (2006.01)
*B01D 71/36* (2006.01)
*B01D 46/10* (2006.01)

(52) U.S. Cl. .................. 95/45; 95/273; 96/4; 96/13; 96/14; 55/522; 55/525; 55/DIG. 5; 264/210.7; 264/288.8; 264/289.3; 264/291; 264/294; 428/311.51; 428/315.5

(58) Field of Classification Search .................. 96/4, 96/13, 14; 95/45, 273; 55/522, 524, 525, 55/DIG. 5; 264/165, 210.7, 288.4, 288.8, 264/289.3, 290.2, 291, 294, 340, 345, 346, 264/348, DIG. 48; 428/311.51, 315.5; 521/145
See application file for complete search history.

(56) References Cited

U.S. PATENT DOCUMENTS

| | | | |
|---|---|---|---|
| 5,510,176 A * | 4/1996 | Nakamura et al. | ....... 428/316.6 |
| 5,772,884 A | 6/1998 | Tanaka et al. | |
| 5,814,405 A * | 9/1998 | Branca et al. | ............ 264/288.8 |
| 5,910,277 A | 6/1999 | Ishino et al. | |

(Continued)

FOREIGN PATENT DOCUMENTS

EP    0 661 336 A1    7/1995

(Continued)

*Primary Examiner*—Jason M Greene
(74) *Attorney, Agent, or Firm*—Hamre, Schumann, Mueller & Larson, P.C.

(57) ABSTRACT

Provided is a method of manufacturing a porous polytetrafluoroethylene (PTFE) membrane capable of achieving both a high collection efficiency and a low pressure drop, though it has a larger average pore size and a greater thickness than conventional porous PTFE membranes. This manufacturing method includes: stretching an unsintered polytetrafluoroethylene sheet by a factor of 5 to 30 in a predetermined direction at a temperature equal to or higher than the melting point of polytetrafluoroethylene; further stretching the stretched sheet by a factor of 5 to 40 in a direction different from the predetermined direction at a temperature lower than the melting point; and after the stretchings, heating the stretched sheet at a temperature equal to or higher than the melting point.

10 Claims, 3 Drawing Sheets

U.S. PATENT DOCUMENTS 6,030,428 A * 2/2000 Ishino et al. .................. 96/13
6,261,979 B1   7/2001 Tanaka et al.

FOREIGN PATENT DOCUMENTS

| JP | 7-196831 A | 8/1995 |
| JP | 10-030031 A | 2/1998 |
| JP | 10-165787 * | 6/1998 |
| JP | 10-165787 A | 6/1998 |
| JP | 10-287759 A | 10/1998 |
| JP | 11-080397 * | 3/1999 |
| JP | 11-080397 A | 3/1999 |
| JP | 2004-231756 A | 8/2004 |
| WO | WO 94/16802 A1 | 8/1994 |
| WO | WO 98/26860 A1 | 6/1998 |

* cited by examiner

METHOD OF MANUFACTURING POROUS POLYTETRAFLUOROETHYLENE MEMBRANE, FILTER MEDIUM, AND FILTER UNIT

TECHNICAL FIELD

The present invention relates to a method of manufacturing a porous polytetrafluoroethylene membrane. The present invention also relates to a filter medium including a porous polytetrafluoroethylene membrane obtained by the manufacturing method, and a filter unit.

BACKGROUND ART

Conventionally, as filter media used for air cleaning and the like, an electrostatic filter medium including a nonwoven fabric made of synthetic fibers such as polypropylene, a mechanical filter medium using glass fibers as a base material, or the like, are known. These filter media can minimize the decrease over time in the efficiency of collecting particles included in a gas permeating therethrough. However, they suffer from the following problems. For example, in the case of an electrostatic filter medium, small fibers contained therein or folding processing thereof may cause self-dusting. In addition, oil mist in the gas may degrade the electrostatic performance of the filter medium, thereby decreasing its collection efficiency. On the other hand, in the case of a mechanical filter medium using glass fibers as a base material, it is difficult to avoid an increase in pressure drop in order to achieve a high collection efficiency.

In recent years, filter media including porous polytetrafluoroethylene (PTFE) membranes have attracted attention as filter media to solve these problems. Generally, a porous PTFE membrane is formed by stretching an unsintered PTFE sheet, as described in, for example, WO 94/16802 A (Reference 1) and JP 7 (1995)-196831 A (Reference 2). In a porous PTFE membrane, self-dusting hardly is caused when the membrane is subjected to folding processing. In addition, a porous PTFE membrane can achieve both a high collection efficiency and a low pressure drop by reducing both the average pore size (generally to 0.5 μm or less) and the thickness (generally to 10 μm or less). In References 1 and 2, such a small average pore size and a small thickness are achieved by stretching an unsintered PTFE sheet biaxially at a temperature lower than the melting point of PTFE.

In the porous PTFE membranes disclosed in References 1 and 2, however, since both a high collection efficiency and a low pressure drop are achieved by a small average pore size and a small thickness, an adequate strength for a membrane hardly can be ensured, which may cause defects such as pinholes.

DISCLOSURE OF INVENTION

Accordingly, it is an object of the present invention to provide a method of manufacturing a porous PTFE membrane capable of achieving both a high collection efficiency and a low pressure drop, though it has a larger average pore size and a greater thickness than these conventional porous PTFE membranes.

According to a method of manufacturing a porous PTFE membrane of the present invention, an unsintered polytetrafluoroethylene sheet is stretched by a factor of 5 to 30 in a predetermined direction at a temperature equal to or higher than the melting point of polytetrafluoroethylene, and the stretched sheet further is stretched by a factor of 5 to 40 in a direction different from the predetermined direction at a temperature lower than the melting point. After these stretchings, the stretched sheet is heated at a temperature equal to or higher than the melting point.

A filter medium of the present invention is a filter medium for collecting particles included in a gas to be filtered. This filter medium includes a porous polytetrafluoroethylene membrane obtained by the manufacturing method of the present invention.

A filter unit of the present invention is a filter unit including: a filter medium for collecting particles included in a gas to be filtered; and a supporting frame for supporting the filter medium. This filter medium is the filter medium of the present invention.

According to the manufacturing method of the present invention, an unsintered PTFE sheet is stretched at a temperature equal to or higher than the melting point of PTFE (327° C.) (stretching A), and then the stretched sheet is further stretched at a temperature lower than the above melting point (stretching B). After these stretchings, the stretched sheet is heated at a temperature equal to or higher than the melting point. Thus, a porous PTFE membrane capable of achieving both a high collection efficiency and a low pressure drop can be obtained, though it has a larger average pore size and a greater thickness than ever before.

This porous PTFE membrane has an excellent strength, thus minimizing the occurrence of a defect such as pinholes. Therefore, it is suitable for a use as a filter medium.

Figure 1:
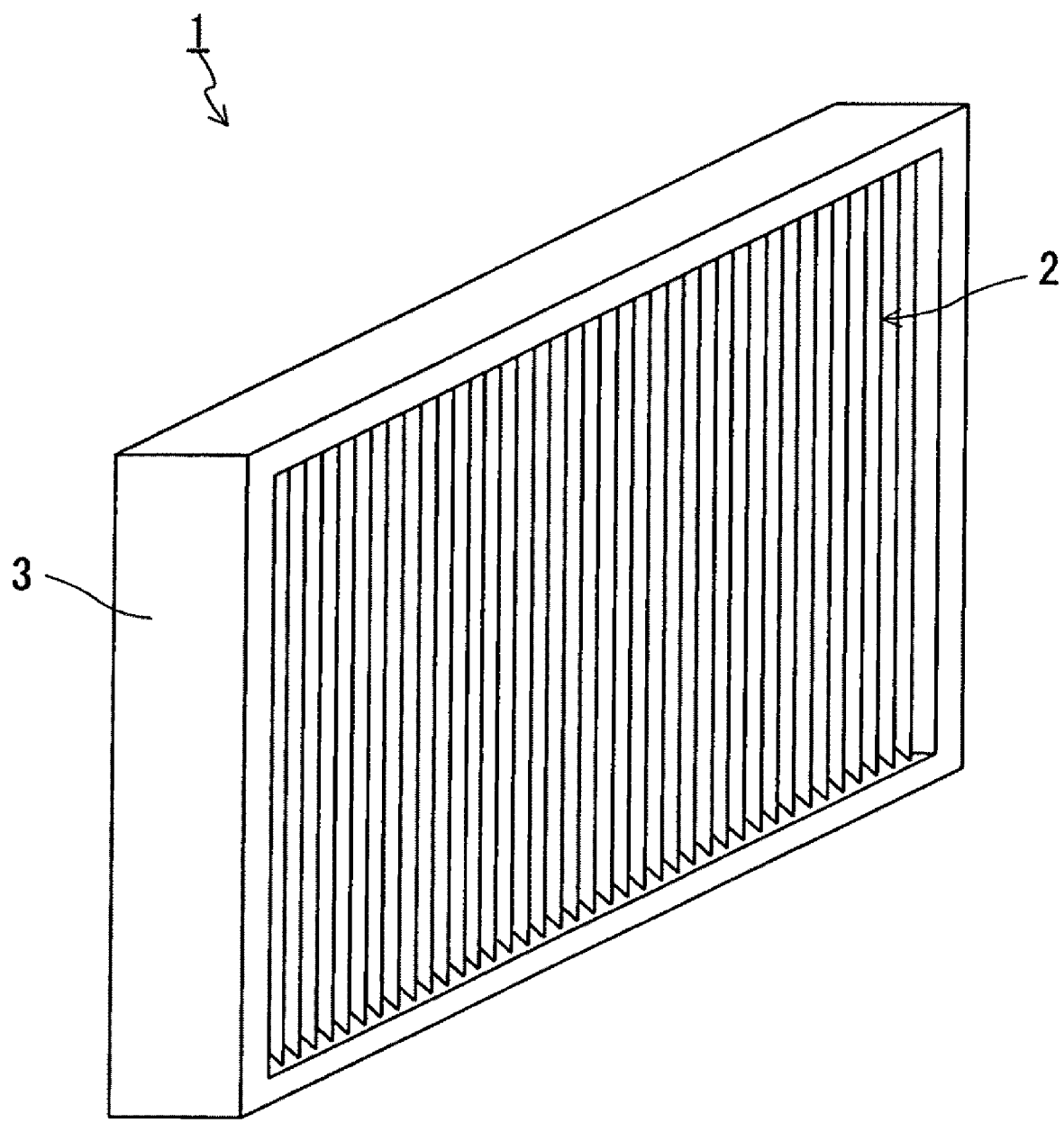
FIG. 1 is a perspective view schematically illustrating an example of a filter unit of the present invention.

BEST MODE FOR CARRYING OUT THE INVENTION (Stretching A)

The stretching A is not limited to a specific technique or the like as long as an unsintered PTFE sheet is stretched by a factor of 5 to 30 at a temperature equal to or higher than the melting point of PTFE. For example, an unsintered PTFE sheet may be stretched in a heating furnace maintained at a temperature equal to or higher than the melting point. In this case, the PTFE sheet can be stretched at a temperature equal to or higher than the melting point by setting appropriately a time period during which the PTFE sheet should stay in the heating furnace.

The direction of the stretching A (a predetermined direction) is not particularly limited. If the unsintered PTFE sheet is strip-shaped, the direction may be a longitudinal direction of the sheet, for example.

The stretch ratio of the stretching A is preferably in a range of 5 to 25.

The temperature at which the stretching A is carried out generally may be in a range of 327 to 400° C., and is preferably 350° C. or higher.

During the stretching A, it is presumed that not only fibrils are formed extending in the stretching direction but also nodes are formed by partial aggregation of PTFE in the PTFE sheet. In addition, the PTFE sheet is stretched at a temperature equal to or higher than the melting point of PTFE. Therefore, it is possible to prevent the thickness of the PTFE sheet from being reduced excessively.

(Stretching B)

The stretching B is not limited to a specific technique or the like as long as a PTFE sheet that has been subjected to the stretching A is stretched by a factor of 5 to 40 in the direction different from the direction of the stretching A at a temperature lower than the melting point of PTFE. For example, the PTFE sheet that has been subjected to the stretching A may be stretched in a heating furnace maintained at a temperature lower than the melting point. In this case, the PTFE sheet can be stretched at a temperature lower than the melting point by setting appropriately a time period during which the PTFE sheet should stay in the heating furnace.

The direction of the stretching B is not particularly limited as long as it is different from the direction of the stretching A. For example, the direction of the stretching B may be a direction orthogonal to the direction of the stretching A within the in-plane of the PTFE sheet. More specifically, when the PTFE sheet to be stretched is strip-shaped, the direction of the stretching B may be the lateral direction (width direction) thereof.

The stretch ratio of the stretching B is preferably in a range of 5 to 30. It is preferable that the area stretch ratio expressed by the product of the stretch ratio of the stretching A and the stretch ratio of the stretching B is 300 or less. When the area stretch ratio exceeds 300, the average pore size of the porous PTFE membrane thus formed becomes excessively large, which may lower the collection efficiency excessively. In order to form a porous PTFE membrane having a higher collection efficiency, the area stretch ratio is preferably 250 or less, and more preferably 150 or less.

The temperature at which the stretching B is carried out generally may be at least 25° C. It is preferably in a range of 40 to 200° C., and more preferably in a range of 100 to 200° C.

The stretching B may be carried out subsequently to the stretching A in succession.

During the stretching B, it is presumed that fibrils become still thinner and finer and boundaries between nodes and fibrils become better defined.

(Heat Treatment)

According to the manufacturing method of the present invention, after the stretching B is carried out, the stretched PTFE sheet is subjected to heat treatment by heating it at a temperature equal to or higher than the melting point of PTFE. The heat treatment is not particularly limited to a specific technique or the like. For example, the PTFE sheet that has been stretched may be placed in a heating furnace maintained at a temperature equal to or higher than the melting point. In this case, the PTFE sheet can be subjected to the heat treatment at a temperature equal to or higher than the melting point by setting appropriately a time period during which the PTFE sheet should stay in the heating furnace.

It is preferable that the heat treatment is carried out while the dimension of the PTFE sheet is fixed. The temperature of the heat treatment is preferably in a range of 350 to 400° C.

The heat treatment may be carried out subsequently to the stretching B in succession.

During the heat treatment, it is presumed that fibrils merge with one another in the PTFE sheet.

In the conventional methods of manufacturing porous PTFE membranes including the above-described References 1 and 2, and, among them, in the methods of manufacturing porous PTFE membranes exhibiting high collection efficiencies, heat treatment is not further carried out at a temperature equal to or higher than the melting point of PTFE after a stretching at a temperature equal to or higher than the melting point of PTFE and a stretching at a temperature lower than the melting point thereof are carried out in combination. This is because in the conventional methods, both a high collection efficiency and a low pressure drop are achieved by reducing an average pore size and a thickness of a porous PTFE membrane. For this reason, in References 1 and 2, stretching is not carried out at a temperature equal to or higher than the melting point of PTFE but biaxial stretching is carried out at a temperature lower than the melting point. In these manufacturing methods, fibrils are broken apart into very thin and fine pieces on the whole, which will also be described later in Examples. As a result, a porous PTFE membrane having an average pore size of 0.5 μm or less and an area of each node of not larger than an area of a circle with a diameter of 1 μm is formed, for example (see Reference 2).

On the other hand, the present inventors have found out that the above-mentioned manufacturing method makes it possible to achieve both a high collection efficiency and a low pressure drop of a porous PTFE membrane while the membrane has a larger average pore size and a greater thickness than the conventional ones. The manufacturing method of the present invention makes it possible to form a porous PTFE membrane in which fibrils are not as thin and fine as those of the conventional membranes, which also will be described later in Examples. For example, a porous PTFE membrane in which nodes with areas of at least 1 μm$^2$ are included and a distance between nodes is in a range of several dozens to 100 μm can be formed.

How to form an unsintered PTFE sheet to be used for the manufacturing method of the present invention is not particularly limited. The unsintered PTFE sheet may be obtained by forming a mixture of PTFE fine powder and a liquid lubricant into a sheet by at least one method selected from extrusion and rolling.

The type of the PTFE fine powder is not particularly limited, and commercially available products may be used. Examples of the commercially available PTFE fine powder include Polyflon F-104 (manufactured by Daikin Industries, Ltd.), Fluon CD-123 (manufactured by Asahi-ICI Fluoropolymers, Co., Ltd.), and Teflon 6J (manufactured by Mitsui-DuPont Fluoro-Chemical Co., Ltd.).

The type of a liquid lubricant is not particularly limited as long as it is a substance that can wet the surface of the PTFE fine powder and can be removed by a technique such as evaporation and extraction after the above-mentioned mixture is formed into a sheet. Examples of the liquid lubricant that may be used include hydrocarbon oils such as liquid paraffin, naphtha, white oil, toluene, and xylene, as well as various kinds of alcohols, ketones, and esters.

The mixing ratio between the PTFE fine powder and the liquid lubricant may be adjusted as appropriate depending on the types of the PTFE fine powder and the liquid lubricant, the forming method of the PTFE sheet, and the like. The amount of the liquid lubricant to be mixed is generally in a range of 5 to 50 parts by weight per 100 parts by weight of the PTFE fine powder.

Extrusion and/or rolling are not particularly limited as specific methods. For example, the above-mentioned mixture may be molded into a rod by extrusion, followed by rolling the molded body thus obtained with a pair of rollers to form it into a sheet. The mixture also may be molded into a sheet by extrusion directly, or the mixture may be molded into a sheet by extrusion and then further subjected to rolling.

The thickness of the unsintered PTFE sheet may be adjusted as appropriate depending on the desired thickness of a porous PTFE membrane, and it is generally in a range of 0.05 to 0.5 mm.

It is preferable that the liquid lubricant is removed from the PTFE sheet by a technique such as heating or extraction before the sheet is subjected to the stretching A.

The manufacturing method of the present invention makes it possible to form a porous PTFE membrane having the following properties by adjusting as appropriate the temperatures of the stretching A, stretching B and heat treatment, the stretch ratios of the stretchings A and B, the thickness of the unsintered PTFE sheet, and the like.

(Average Pore Size)

According to the manufacturing method of the present invention, a porous PTFE membrane having an average pore size of 1 to 5 μm can be formed. The average pore size can be controlled mainly by adjusting the stretch ratios of the stretchings A and B. A porous PTFE membrane having a larger average pore size can be obtained as the stretch ratios are increased.

(Pressure Prop)

The manufacturing method of the present invention makes it possible to form a porous PTFE membrane having a thickness of at least 5 μm but not more than 35 μm and preferably more than 10 μm but not more than 35 μm, and having a pressure drop of 100 Pa or less when a gas permeates through the membrane at a flow rate of 5.3 cm/sec.

The manufacturing method of the present invention makes it possible to form a porous PTFE membrane having a thickness of more than 35 μm but not more than 50 μm and a pressure drop of 200 Pa or less when a gas permeates through the membrane at a flow rate of 5.3 cm/sec.

(Collection Efficiency)

The manufacturing method of the present invention makes it possible to form a porous PTFE membrane that collects particles having diameters of 0.3 to 0.5 μm at an efficiency of 89% or more when a gas including the particles permeates through the membrane at a flow rate of 5.3 cm/sec. Furthermore, a porous PTFE membrane that collects the particles at an efficiency of 90% or more, 99% or more, or 99.97% or more can be formed mainly by adjusting the stretch ratios of the stretchings A and B. The porous PTFE membrane that collects the particles at an efficiency of 99.97% or more can be used as a so-called HEPA filter.

(Strength)

The manufacturing method of the present invention makes it possible to form a porous PTFE membrane having a needle penetration strength of 0.2 N/mm$^2$ or more, and preferably 0.3 N/mm$^2$ or more in a predetermined needle penetration test. The details of the needle penetration test will be described later in Examples.

(Filter Medium)

The filter medium of the present invention includes a porous PTFE membrane obtained by the manufacturing method of the present invention (the porous PTFE membrane of the present invention), and in this filter medium, both a high collection efficiency and a low pressure drop can be achieved. The collection efficiency and the pressure drop of the filter medium of the present invention are basically the same as those of the porous PTFE membrane of the present invention as described above, though depending on the types of respective layers included in the filter medium and the number thereof.

The filter medium of the present invention may include a layer other than the porous PTFE membrane of the present invention. For example, it may include an air-permeable supporting member for supporting the porous membrane. In this case, the strength of the filter medium further can be enhanced and the lifespan thereof further can be extended.

When the filter medium of the present invention includes a porous PTFE membrane and an air-permeable supporting member, they simply may be stacked with each other, or they may be integrated by a technique such as adhesive lamination and heat lamination.

The material and structure of the air-permeable supporting member are not particularly limited as long as it has better air-permeability than the porous PTFE membrane of the present invention. The structure of the air-permeable supporting member may be, for example, felt, nonwoven fabric, woven fabric, and meshes (network sheet). The air-permeable supporting member preferably is made of nonwoven fabric due to its excellent strength, flexibility and workability in manufacturing processes. In this case, at least part of fibers constituting the nonwoven fabric may be conjugated fibers having a so-called core-sheath structure. When the melting point of the core component is higher than that of the sheath component, it becomes easier to thermally press-bond the air-permeable supporting member with the porous PTFE membrane in manufacturing the filter medium. In addition, when the filter medium is subjected to folding processing such as pleating, the number of folds per unit length can be increased.

Examples of materials for the air-permeable supporting member include polyolefines (such as polyethylene and polypropylene), polyester, polyamide (such as nylon), aromatic polyamide, and a composite material of these materials. Examples of the air-permeable supporting member include porous membranes of fluorine resins such as a tetrafluoroethylene-perfluoroalkyl vinyl ether copolymer (PFA), a tetrafluoroethylene-hexafluoropropylene copolymer (FEP), or a PTFE.

(Filter Unit)

FIG. 1 shows an example of the filter unit of the present invention. A filter unit 1 shown in FIG. 1 is a filter unit including a filter medium 2 for collecting particles included in a gas to be filtered and a supporting frame 3 for supporting the filter medium 2. The filter medium 2 is the filter medium of the present invention as described above.

In the filter unit 1, both a high collection efficiency and a low pressure drop can be achieved at the same time.

In the example shown in FIG. 1, the filter medium 2 is pleated. However, the filter medium 2 may be an unpleated one.

The supporting frame 3 may employ a commonly used material for filter units, and the shape of the supporting frame 3 also may be determined appropriately. The filter medium 2 may be supported in the supporting frame 3 in a manner used for general filter units.

EXAMPLES

Hereinafter, the present invention is described further in detail using Examples. The present invention is not limited to the following Examples.

In these Examples, 10 types of porous PTFE membrane samples (6 types of Examples and 4 types of Comparative Examples) were prepared. The properties of each of these porous membrane samples, namely, the average pore diameter (μm), thickness (μm), pressure drop (Pa), collection efficiency (%) and needle penetration strength (N/mm$^2$), were evaluated.

How the properties of each porous membrane sample were evaluated is described below.

(Average Pore Size)

The mean flow pore size of each porous membrane sample was measured with a Perm Porometer manufactured by Porous Materials Inc., and the obtained mean flow pore size was considered as the average pore size of each porous membrane sample.

(Thickness)

The thickness of each porous membrane sample was measured with a dial gauge SM-1201 manufactured by Teclock Corporation. More specifically, the thickness of a layered material in which 12 porous membranes of each sample are stacked was measured with the dial gauge, and the obtained measurement value was divided by 12, which is the number of the stacked membranes of the sample. Thus, the thickness of each sample was obtained.

(Pressure Prop)

Each porous membrane sample was set in a circular holder having an effective transmission area of 100 cm$^2$. A pressure difference is generated on both sides of the sample so that a gas permeates through the sample (an amount of gas permeated: 31.8 L/min), and a pressure drop was measured with a pressure gauge (manometer) when the gas permeates through the sample at a flow rate of 5.3 cm/sec. Thus, the pressure drop of each porous membrane sample was obtained.

(Collection Efficiency)

The same measurement devices as those used for measuring the pressure drop were used. Specifically, a gas including polydisperse dioctyl phthalate (DOP) particles was supplied so as to permeate through each porous membrane sample set in the above-mentioned holder at a flow rate of 5.3 cm/sec, and the concentration of the DOP particles on the downstream end of the sample was measured with a particle counter (KC-18 manufactured by Rion Co., Ltd.). Thus, the collection efficiency of each porous membrane sample was obtained. In this regard, the DOP particles were mixed into the gas permeating the sample in such a manner that the concentration of particles with a size in a range of 0.3 to 0.5 μm was 10$^7$ particles per liter, and the concentration of the particles with a size in a range of 0.3 to 0.5 μm was measured with the particle counter. The collection efficiency was calculated from the following equation:

Collection efficiency=(1−(DOP particle concentration on the downstream end/DOP particle concentration on the upstream end))×100(%).

(Needle Penetration Strength)

A needle penetration test was carried out for each porous membrane sample under the conditions of a holder diameter of 11.3 mmφ and an indentation rate of 2 mm/sec, using a handy compression tester KES-G5 manufactured by Kato Tech Co., Ltd. and a needle, as a pressurizing member, with a diameter of 1.0 mm and a tip curvature R=0.5 mm. A pressure was applied to the porous membrane sample until it was broken, and the maximum load at that time was obtained as a needle penetration strength.

(Preparation of Each Porous PTFE Membrane Sample)

Each porous PTFE membrane sample was prepared by the following method.

100 parts by weight of PTFE fine powder (Fluon CD-123 manufactured by Asahi-ICI Fluoropolymers, Co., Ltd.) were mixed uniformly with 20 parts by weight of liquid paraffin as a liquid lubricant. As a result, a PTFE paste that is a mixture of the PTFE fine powder and liquid lubricant was formed. Next, the PTFE paste thus formed was molded into a rod by extrusion under a pressure of 2 MPa (20 Kg/cm$^2$), followed by rolling the rod with a pair of metal rollers to form a strip-shaped PTFE sheet (with a thickness of 0.2 mm). Then, after removing the liquid paraffin from the PTFE sheet thus formed by an extraction method using trichloroethylene, the resultant PTFE sheet was wound up around a tubular core body.

Next, the PTFE sheet thus formed was stretched uniaxially in the longitudinal direction thereof while being fed continuously from the core body. Then, the sheet was stretched uniaxially in the lateral direction thereof, and further subjected to heat treatment if necessary. Thus, porous PTFE membrane samples (Examples 1 to 6 and Comparative Examples 1 to 4) were obtained respectively. The uniaxial stretchings in the longitudinal direction and the lateral direction respectively as well as the heat treatment as described above were carried out in a heating furnace maintained at respective temperatures shown in Table 1 below. In this procedure, each PTFE sheet was placed in the heating furnace for long enough so that the PTFE sheet was stretched or subjected to the heat treatment in the state where it has already reached the temperature shown in Table 1.

Table 1 below shows the conditions of stretchings of each porous membrane sample, and whether or not it was subjected to heat treatment and the condition of the heat treatment.

TABLE 1

| | Longitudinal stretching | | Lateral stretching | | | Heat |
| --- | --- | --- | --- | --- | --- | --- |
| Sample No. | Stretch ratio | Stretching temperature (° C.) | Stretch ratio | Stretching temperature (° C.) | Heat treatment | treatment temperature (° C.) |
| Example 1 | 20 | 370 | 6 | 130 | Yes | 370 |
| Example 2 | 15 | 390 | 10 | 150 | Yes | 400 |
| Example 3 | 10 | 350 | 5 | 100 | Yes | 350 |
| Example 4 | 5 | 400 | 30 | 200 | Yes | 390 |
| Example 5 | 20 | 370 | 15 | 180 | Yes | 390 |
| Example 6 | 25 | 350 | 10 | 130 | Yes | 380 |
| Comparative | 20 | 285 | 30 | 130 | Yes | 370 |

TABLE 1-continued

| | Longitudinal stretching | | Lateral stretching | | | Heat treatment temperature (° C.) |
|---|---|---|---|---|---|---|
| Sample No. | Stretch ratio | Stretching temperature (° C.) | Stretch ratio | Stretching temperature (° C.) | Heat treatment | |
| Example 1 Comparative Example 2 | 45 | 390 | 2 | 150 | Yes | 370 |
| Comparative Example 3 | 3 | 350 | 10 | 100 | No | — |
| Comparative Example 4 | 5 | 100 | 30 | 200 | No | — |

Next, each porous membrane sample thus obtained was subjected to evaluation of each property according to the methods as described above. Table 2 below shows the results of the evaluation.

TABLE 2

| Sample No | Average pore size (μm) | Thickness (μm) | Pressure drop (Pa) | Collection efficiency (%) | Needle penetration strength (N/mm$^2$) |
|---|---|---|---|---|---|
| Example 1 | 3.5 | 30 | 65 | 98 | 0.7 |
| Example 2 | 4 | 45 | 150 | 99.97 | 2.5 |
| Example 3 | 1 | 50 | 200 | 99.97 | 5 |
| Example 4 | 2 | 35 | 100 | 99 | 1.5 |
| Example 5 | 5 | 25 | 45 | 90 | 0.3 |
| Example 6 | 5 | 20 | 40 | 89 | 0.5 |
| Comparative Example 1 | 0.7 | 3 | 65 | 99 | 0.1 |
| Comparative Example 2 | 6 | 5 | 10 | 53 | 0.1 |
| Comparative Example 3 | 0.5 | 50 | 400 | 99.999 | 6 |
| Comparative Example 4 | 0.5 | 7 | 170 | 99.99 | 0.3 |

As shown in Table 2, porous. PTFE membranes of Examples 1 to 6 achieved both high collection efficiencies and low pressure drops, though they have larger average pore sizes and greater thicknesses than those of Comparative Examples 1, 3 and 4. In Comparative Example 2, the stretching A, the stretching B, and the heat treatment at a temperature equal to or higher than the melting point of PTFE were carried out, as with Examples 1 to 6. Since the longitudinal stretch ratio of 45 was excessively large, the obtained porous membrane had an excessively large average pore size of 6 μm. As a result, this porous membrane had a very low collection efficiency of 53%, though it exhibited a very low pressure drop.

The porous PTFE membranes of Examples 1 to 6 had higher needle penetration strengths than those of Comparative Examples 1, 2 and 4. That is, the porous PTFE membranes of Examples 1 to 6 were superior in strength to those of Comparative Examples 1, 2 and 4. The membrane of Comparative Example 3 had a higher needle penetration strength of 6 N/mm$^2$ than those of Examples 1 to 6, but showed a very high pressure drop of 400 Pa at a thickness of 50 μm.

Figure 2:
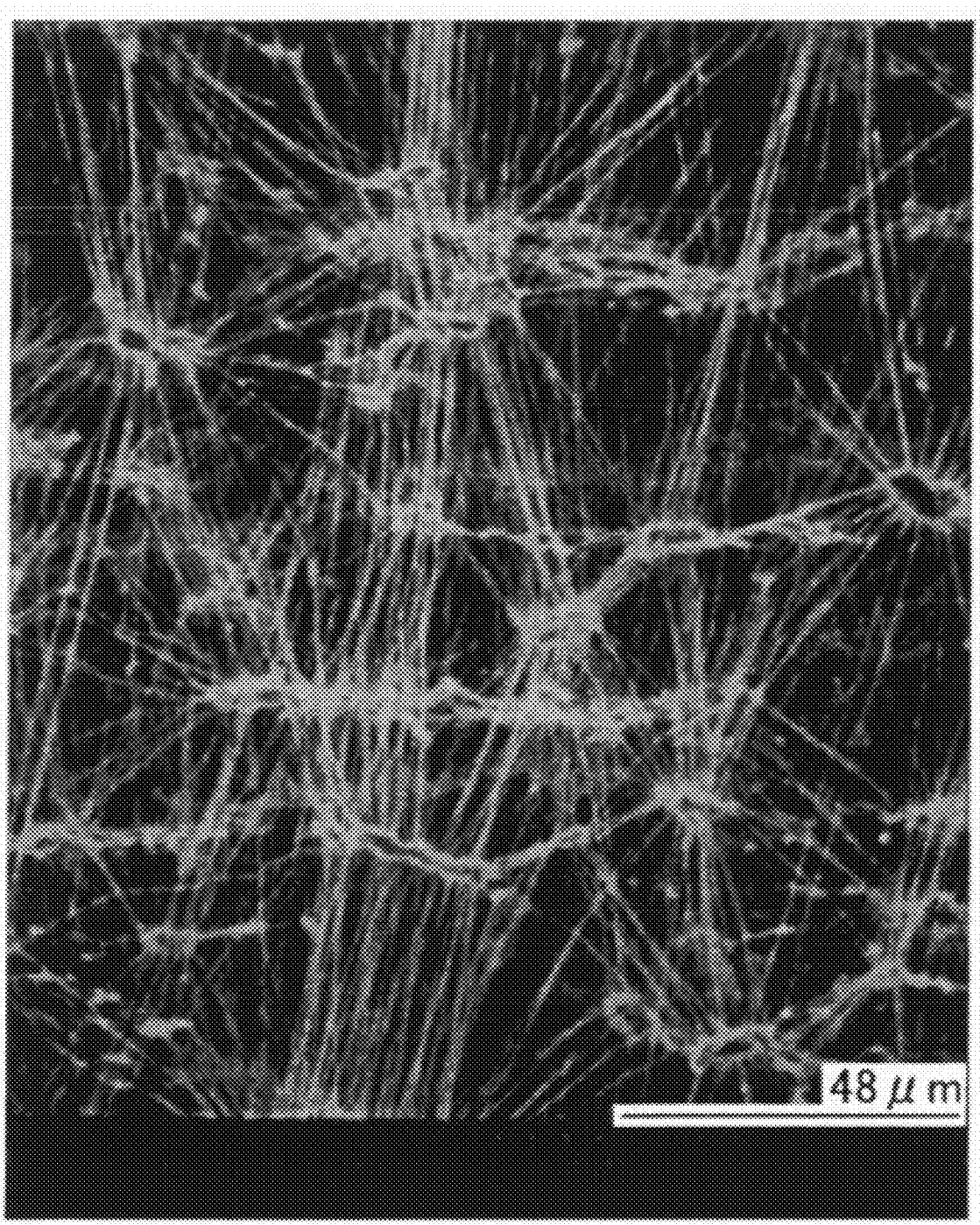
FIG. 2 is a view showing a structure of a porous PTFE membrane sample (Example 1) prepared in Examples.
Figure 3:
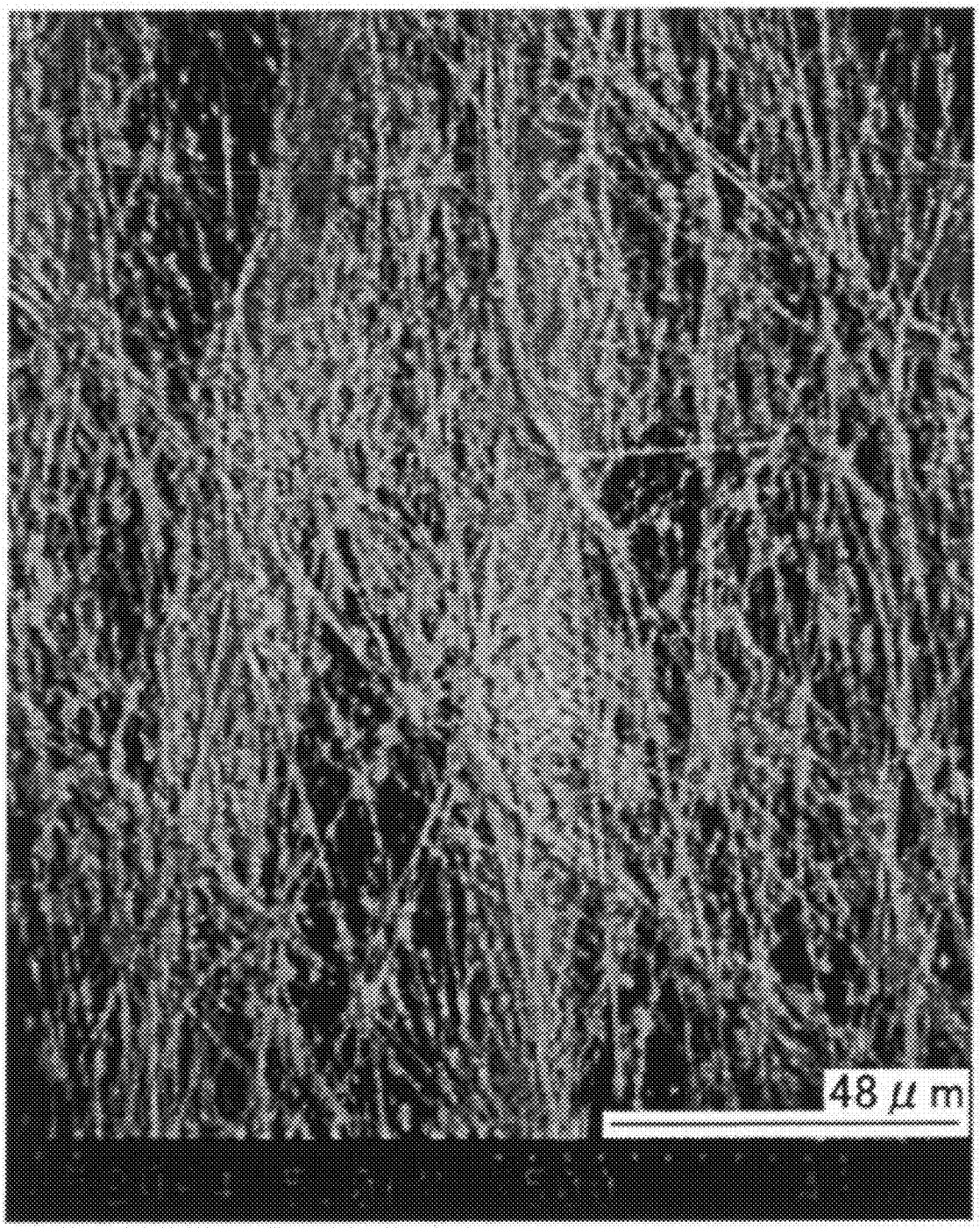
FIG. 3 is a view showing a structure of a porous PTFE membrane sample (Comparable Example 1) prepared in Examples.

Aside from the above-described evaluation of each property, the structures of the porous membrane samples of Example 1 and Comparative Example 1 were evaluated using a scanning electron microscope (SEM). FIG. 2 shows an SEM image of Example 1, and FIG. 3 shows an SEM image of Comparative Example 1. Comparative Example 1 is a sample obtained by stretching a strip-shaped PTFE sheet in the longitudinal and lateral directions at a temperature lower than the melting point of PTFE and then carrying out heat treatment of the stretched sheet at a temperature equal to or higher than the melting point of PTFE.

As shown in FIG. 3, the sample of Comparative Example 1 had a structure in which fibrils were broken apart into very thin and fine pieces on the whole, nodes were not clearly seen, and the area of each node was less than 1 μm$^2$ if there are any nodes.

On the other hand, as shown in FIG. 2, the sample of Example 1 had a structure in which fibrils were not as thin and fine as those of Comparative Example 1, a large number of nodes were clearly seen, and nodes with areas of more than 1 μm$^2$ are included.

The present invention may be embodied in other specific forms without departing the spirit and the essential features thereof. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

INDUSTRIAL APPLICABILITY

According to the present invention, it is possible to provide a method of manufacturing a porous PTFE membrane capable of achieving both a high collection efficiency and a low pressure drop, though it has a larger average pore size and a greater thickness than conventional porous PTFE membranes. The porous PTFE membrane obtained by the manufacturing method of the present invention is suitable for a use as a filter medium for collecting particles included in a gas to be filtered, and as a filter unit.

The invention claimed is:

1. A method of manufacturing a porous polytetrafluoroethylene membrane, comprising the steps of:
    stretching an unsintered polytetrafluoroethylene sheet by a factor of 5 to 30 in a predetermined direction at a temperature equal to or higher than the melting point of polytetrafluoroethylene;
    further stretching the stretched sheet by a factor of 5 to 40 in a direction different from the predetermined direction at a temperature lower than the melting point; and
    after the stretchings, heating the stretched sheet at a temperature equal to or higher than the melting point.

2. The method of manufacturing a porous polytetrafluoroethylene membrane according to claim 1, wherein the unsintered polytetrafluoroethylene sheet is strip-shaped,
the predetermined direction is a longitudinal direction of the sheet, and
the different direction is a lateral direction of the sheet.

3. The method of manufacturing a porous polytetrafluoroethylene membrane according to claim 1,
wherein a mixture of polytetrafluoroethylene fine powder and a liquid lubricant is molded into a sheet by at least one method selected from extrusion and rolling so as to obtain the unsintered polytetrafluoroethylene sheet.

4. The method of manufacturing a porous polytetrafluoroethylene membrane according to claim 1,
wherein the porous polytetrafluoroethylene membrane has an average pore size of 1 to 5 μm.

5. The method of manufacturing a porous polytetrafluoroethylene membrane according to claim 1,
wherein the porous polytetrafluoroethylene membrane has a thickness of at least 5 μm but not more than 35 μm and a pressure drop of 100 Pa or less when a gas permeates through the membrane at a flow rate of 5.3 cm/sec.

6. The method of manufacturing a porous polytetrafluoroethylene membrane according to claim 1,
wherein the porous polytetrafluoroethylene membrane has a thickness of more than 35 μm but not more than 50 μm and a pressure drop of 200 Pa or less when a gas permeates through the membrane at a flow rate of 5.3 cm/sec.

7. The method of manufacturing a porous polytetrafluoroethylene membrane according to claim 1,
wherein the porous polytetrafluoroethylene membrane collects particles having diameters of 0.3 to 0.5 μm at an efficiency of 89% or more when a gas including the particles permeates through the membrane at a flow rate of 5.3 cm/sec.

8. The method of manufacturing a porous polytetrafluoroethylene membrane according to claim 7,
wherein the porous polytetrafluoroethylene membrane collects the particles at an efficiency of 99.97% or more.

9. A filter medium for collecting particles included in a gas to be filtered, comprising a porous polytetrafluoroethylene membrane obtained by the manufacturing method according to claim 1.

10. A filter unit comprising:
a filter medium for collecting particles included in a gas to be filtered; and
a supporting frame for supporting the filter medium,
wherein the filter medium is the filter medium according to claim 9.

* * * * *